United States Patent
McConville et al.

(10) Patent No.: US 10,154,158 B2
(45) Date of Patent: Dec. 11, 2018

(54) SYSTEM FOR APPLYING A MARK TO AN OBJECT IN AN OBJECT HOLDER OF A DIRECT-TO-OBJECT PRINTER

(71) Applicant: Xerox Corporation, Norwalk, CT (US)

(72) Inventors: Paul J. McConville, Webster, NY (US); Jason M. Lefevre, Penfield, NY (US); Chu-Heng Liu, Penfield, NY (US); Douglas K. Herrmann, Webster, NY (US); Kelly Burton, Rochester, NY (US); Christopher Douglas Atwood, Rochester, NY (US); Elizabeth M. Crossen, Churchville, NY (US); Annie Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 53 days.

(21) Appl. No.: 15/477,156

(22) Filed: Apr. 3, 2017

(65) Prior Publication Data

US 2018/0281456 A1    Oct. 4, 2018

(51) Int. Cl.
*H04N 1/00*    (2006.01)
*H04N 1/387*   (2006.01)
(Continued)

(52) U.S. Cl.
CPC ....... *H04N 1/00129* (2013.01); *B41F 17/002* (2013.01); *B41F 17/006* (2013.01);
(Continued)

(58) Field of Classification Search
CPC ............. H04N 1/0035; H04N 1/00352; H04N 1/00384; H04N 1/00392; H04N 1/00405; H04N 1/00408; H04N 1/00411; H04N 1/0044; H04N 1/00466; H04N 1/00469; H04N 1/00474; H04N 1/00482;
(Continued)

(56) References Cited

U.S. PATENT DOCUMENTS 6,135,654 A * 10/2000 Jennel ................. B41J 2/01
                                                101/35
9,070,055 B2 * 6/2015 Miller ............... G06K 15/027
(Continued)

OTHER PUBLICATIONS

U.S. Appl. No. 15/163,880, filed May 25, 2016.

*Primary Examiner* — Scott A Rogers
(74) *Attorney, Agent, or Firm* — Philip E. Blair; Fleit Gibbons Gutman Bongini & Bianco P.L.

(57) ABSTRACT

What is disclosed is system which facilitates the application of a mark to a surface of an object in a direct-to-object print system and a direct-to-object print system configured to use various embodiments of the present marking system. The present marking system comprises a camera for capturing an image of an object retained by an object holder configured to slideably traverse a support member positioned to be parallel to a plane formed by at least one printhead configured to eject in onto a surface of the object. A processor receives an image of an object held and communicates the image to a display. A mark to be printed on the object is retrieved and overlaid on the object in the image. A location of the overlaid mark is determined and communicated to a controller which causes the printhead to print the mark on the object at the location.

16 Claims, 10 Drawing Sheets

(51) Int. Cl.
*H04N 1/393* (2006.01)
*B41J 3/407* (2006.01)
*B41F 17/00* (2006.01)

(52) U.S. Cl.
CPC .......... *B41J 3/4073* (2013.01); *H04N 1/0044* (2013.01); *H04N 1/00278* (2013.01); *H04N 1/00326* (2013.01); *H04N 1/00342* (2013.01); *H04N 1/00411* (2013.01); *H04N 1/3872* (2013.01); *H04N 1/3877* (2013.01); *H04N 1/393* (2013.01); *H04N 2201/0084* (2013.01)

(58) Field of Classification Search
CPC .... H04N 1/387; H04N 1/3872; H04N 1/3873; H04N 1/3875; H04N 1/3877; H04N 1/393; H04N 1/3935; H04N 1/00129; H04N 1/00278; H04N 1/00326; H04N 1/00342; H04N 1/00347; H04N 2201/0081; H04N 2201/0082; H04N 2201/0084; H04N 2201/0089; B41F 17/00; B41F 17/002; B41F 17/006; B41F 17/24; B41F 17/28; B41F 17/30; B41F 17/32; B41F 17/34; B41F 33/0036; B41J 3/407; B41J 3/4071; B41J 3/4073; B41J 3/4075; B41J 3/413; B41J 3/38; B41J 11/42

See application file for complete search history.

(56) References Cited

U.S. PATENT DOCUMENTS

| | | | | |
|---|---|---|---|---|
| 9,440,759 | B2* | 9/2016 | Reed | B65C 1/028 |
| 9,827,784 | B1* | 11/2017 | Buchar | A63B 45/02 |
| 9,862,204 | B2* | 1/2018 | Izume | B41F 33/0045 |
| 9,925,726 | B1* | 3/2018 | Bradway | B29C 67/0096 |
| 9,925,799 | B1* | 3/2018 | Fromm | B41J 3/4073 |
| 9,975,327 | B1* | 5/2018 | Yang | B41J 2/04508 |
| 10,005,292 | B1* | 6/2018 | Williams | B41J 11/58 |
| 10,005,302 | B1* | 6/2018 | Vanbortel | B41J 3/4073 |
| 2006/0250464 | A1* | 11/2006 | Sheinman | B41J 3/4073 347/101 |
| 2014/0307269 | A1* | 10/2014 | Hirabayashi | G06K 15/025 358/1.6 |
| 2018/0081602 | A1* | 3/2018 | Ueda | G06F 3/1284 |

* cited by examiner

SYSTEM FOR APPLYING A MARK TO AN OBJECT IN AN OBJECT HOLDER OF A DIRECT-TO-OBJECT PRINTER

TECHNICAL FIELD

The present invention is directed to a printing system for depositing ink directly on to a surface of an object and, more particular, to a system for applying a mark to a surface of an object in a direct-to-object print system.

BACKGROUND

Printers known in the document reproduction arts apply a marking material, such as ink or toner, onto a sheet of paper. To print something on an object that has a non-negligible depth such as a coffee cup, bottle, and the like, typically a label is printed and the printed label is applied to the surface of the object. However, in some manufacturing and production environments, it is desirable to print directly on the object itself but this poses a diverse set of hurdles which must be overcome before such specialized direct-to-object print systems become more widely accepted in commerce. One such hurdle is how to quickly manipulate what is to be printed on the object while the object is being held by an object holder in the direct-to-object print system. The present invention is specifically directed to a system for applying a mark to a surface of an object retained by an object holder of a direct-to-object print system.

BRIEF SUMMARY

What is disclosed is a system for applying a mark to a surface of an object in a direct-to-object print system having at least one printhead and an object holder configured to retain the object and to slideably traverse a support member positioned to be parallel to a plane formed by the printhead. In one embodiment, the present marking system comprises a camera for capturing an image of the object held by the object holder and a processor executing machine readable instructions which configure the processor to receive, from the camera, an image of the object held in the object holder and communicate the received image to a display of a user interface. The processor retrieves a mark to be printed on the object. The mark can be letters, numbers, symbols, and images. The mark is overlaid on the object in the image. The processor is further configured to enable a user to selectively adjust a location of the mark on the object, adjust a size of the mark, edit the mark, and/or change an orientation of the mark relative to an edge of the object holder. Thereafter, the processor determines a location of the overlaid mark relative to at least one edge of the object, at least one edge of the object holder, and/or at least one reference point on the object holder. The processor then communicates the mark and the determined location to a controller configured to cause an actuator to move the object holder past the printhead and to cause the printhead to print the mark on the object at the determined location.

What is also disclosed is a direct-to-object print system configured to operatively use various embodiments of the marking system of the present invention. In one embodiment, the direct-to-object print system incorporates at least one printhead configured to eject marking material such as ink. An object holder configured to slideably traverse a support member positioned to be parallel to a plane formed by the printhead. A camera for capturing an image of the object held by the object holder. A user interface comprising a display device. An actuator for operatively causing the object holder to move the object along the support member in to proximity of the printhead. A controller configured to cause the printhead to print the mark at a determined location on the object in the object holder as the object moves past the printhead.

Features and advantages of the above-described marking system and direct-to-object print system will become readily apparent from the following description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system for applying a mark to a surface of an object in a direct-to-object print system, and a direct-to-object print system configured to operatively use various embodiments of the marking system of the present invention.

Non-Limiting Definitions

An "object" has at least one surface thereof to be printed with ink. Example objects are sports equipment and paraphernalia, golf clubs and balls, commemorative gifts, coffee cups, to name a few.

A "direct-to-object print system", or simply "print system" is a printer designed to print on a surface of an object. The direct-to-object print system of FIG. 1 incorporates at least the following functional components: at least one printhead, a support member, an actuator, a controller, an object holder, a user interface, and at least one camera.

A "printhead" or "print head" is an element (such as an inkjet) which emits or ejects a droplet of marking material such as ink on to a surface of an object thereby making a mark on that object. In one embodiment, the direct-to-object print system has a plurality of monochrome printheads and a UV cure lamp. The print zone is a width of a single M-series printhead (~4 inches). Each printhead is fluidly connected to a supply of marking material (not shown).

Some or all of the printheads may be connected to the same supply. Each printhead can be connected to its own supply so each printhead ejects a different marking material. A 10×1 array of printheads is shown at 104 of FIG. 1.

Figure 1:
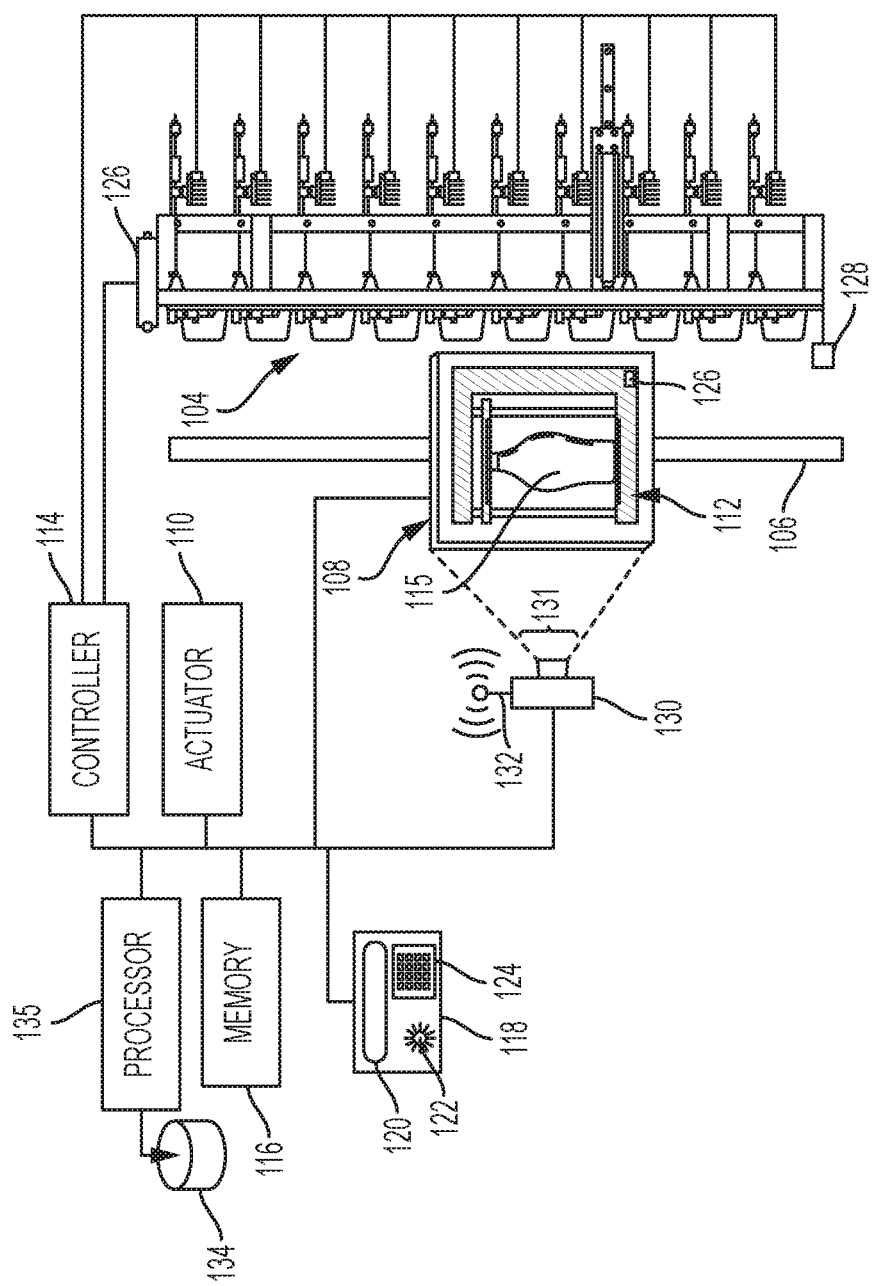
FIG. 1 illustrates one example embodiment of the direct-to-object print system disclosed herein.

A "support member", at 106 of FIG. 1, is positioned to be parallel to a plane formed by the printheads and is oriented so that one end of the support member is at a higher gravitational potential than the other end of the support member. The vertical configuration of the printheads and the support member enables the present direct-to-object print system to have a smaller footprint than a system configured with a horizontal orientation of the printheads and support member. In an alternative embodiment, a horizontal configuration orients the printheads such that the object holder moves an object past the horizontally arranged printheads.

An "actuator", at 110 of FIG. 1, is an electro-mechanical device that causes the object holder to slideably traverse the support member. In one embodiment, a controller causes the actuator to move an object holder at speeds that attenuate the air turbulence in a gap between the printhead and the surface of the object being printed.

Figure 2:
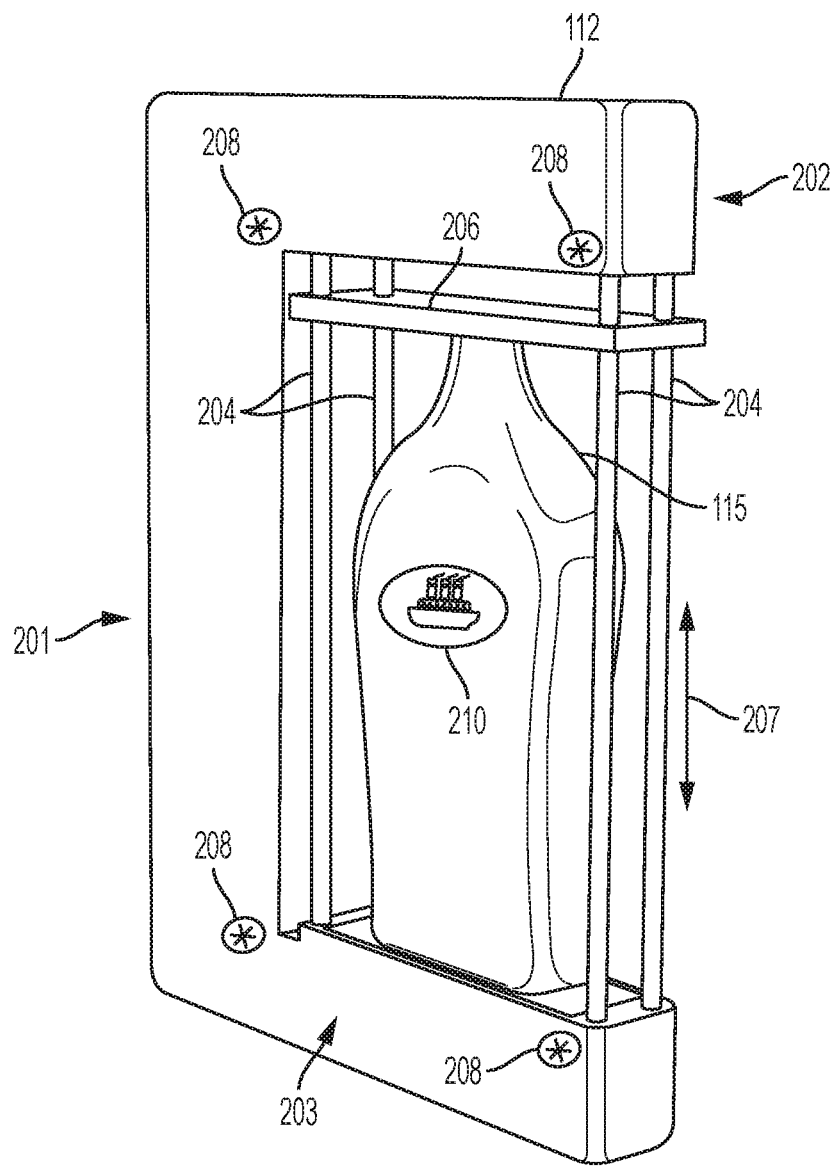
FIG. 2 shows one embodiment of an object holder retaining an object to be printed with a mark.

An "object holder", at 112 of FIG. 1, physically restrains an object while the object holder is moving along the support member 106 so that the object, shown as a bottle 115, can pass the printhead. The object holder is attached to a shuttle mount 108 configured to slideably traverse the support member 106. One embodiment of an object holder is shown in FIG. 2. The object holder of FIG. 2 has a back support 201, a top arm 202 and a bottom arm 203 attached to the back support. The object holder is further configured with four support braces at 204A-D. Each brace is attached to the top and bottom arms. At least one restraining bar 206 is slideably attached to the support braces such that the bar can be raised or lowered (at 207) on to the object 115 which is shown seated between the top and bottom arms. The bar physically retains the object to the object holder. The object holder further has a plurality of reference points 208. The reference points may be located anywhere on the object holder or the components thereof as needed or as desired. Elastomeric pads, or other material, on the bar and/or the bottom arm may be utilized to help support the object retained by the object holder.

A "controller", at 114 of FIG. 1, is a processor or ASIC which controls various components of the present direct-to-object print system. The controller is also shown in communication with a processor 135. It should be appreciated that processor 135 and controller 114 may be on the same circuit board or within the same chip. The controller is configured to retrieve machine readable program instructions from memory 116 which, when executed, configure the controller to signal or otherwise operate the actuator 110 to move the object holder past the printheads. When other retrieved instructions are executed, the controller is configured to signal, or otherwise operate the printheads to start/stop ejecting marking material at a precise time and at a desired location on a surface of the object retained by the object holder. The controller may be further configured to operate the various printheads such that individual printheads eject different size droplets of marking material. The controller may be configured to communicate with a user interface.

A "user interface", at 118 of FIG. 1, generally comprises a display 120 such as a touchscreen, monitor, or LCD device for presenting visual information to a user, an annunciator 122 which emits an audible sound, and an input device 124 such as a keypad for receiving a user input or selection. The controller can be configured to operate the user interface to notify an operator of a failure. The controller monitors the system to detect the configuration of the printheads in the system and the inks being supplied to the printheads. If the inks or the printhead configuration is unable to print the objects accurately and appropriately then a message is presented to the user on the display of the user interface that, for example, inks need to be changed or that the printheads needs to be reconfigured. The controller can be configured to use the annunciator of the user interface to inform the operator of a system status and to attract attention to fault conditions and displayed messages. The user interface may further include a warning light.

An "identification tag", at 126 of FIG. 1, is a machine-readable indicia that is attached to the object holder. The identification tag embodies an identifier that is readable or otherwise receivable by an input device such as sensor 128. The identifier contains information about the object being printed and/or the location of the object as it traverses the support member. The received identifier is, in turn, communicated to the controller. The identification tag can be, for example, a radio frequency identification (RFID) tag with the input device being a RFID reader. The identification tag can also be a barcode with the input device being a barcode reader. In another embodiment, the identification tag comprises one or more protrusions, indentations, or combinations thereof in the object or object holder that can be detected or otherwise read by a biased arm which follows a surface of an area comprising the identification tag. In this embodiment, the biased arm is a cam follower that converts the detected protrusions, indentations, and the like position of the mechanical indicia comprising the identification tag into electrical signals which, in turn, are communicated to the controller for processing. In other embodiments, the identification tag comprises optical or electromagnetic indicia. The controller compares the identifier received from the input device to various identifiers stored in memory 116. The controller can disable operation of the actuator and/or the operation of the printheads in response to the received identifier failing to correspond to an identifier stored in the memory. The controller can also be configured to use the user interface to inform the operator of processing that needs to be performed. For example, an identification tag may indicate that an object in the object holder requires special treatment such as pre-coating prior to printing or post-coating after the object is printed. A location of the identification tag or a failure to detect an identification tag may indicate to the controller that the object held by the object holder is misaligned, has come loose, or is absent altogether. The controller, in these examples, would communicate a message to the display 120 regarding the detected condition(s).

A "sensor", at 128 of FIG. 1, is a device such as a digital camera or other imaging device positioned to generate image data by imaging, for example, a sheet of printed media with a test pattern. The controller is configured to receive the image data from the sensor and analyze the image data to identify printhead alignment, image quality, and other maintenance issues such as inoperative ejectors, low ink supply, or poor ink quality. The controller uses the user interface to notify the operation such that the operator is able to understand the reason why the controller disabled of the direct-to-object print system.

A "camera", at 130 of FIG. 1, as is generally understood, is a device for capturing still images or video of an object in the camera's field of view 131. The images or video of the object may be communicated to a remote device via a wireless communication element 132, shown as an antenna.

Example cameras are monochrome cameras for capturing black/white images and color cameras for capturing color images. In other embodiments, the camera is a device with thermal, infrared, multi-spectral or hyperspectral sensors, or a hybrid device comprising any combination hereof. Cameras typically have an output for retrieving the images and may further incorporate other components such as memory and one or more processors. Standard camera equipment and those with specialized imaging sensors are available from vendors in various streams of commerce. It should be appreciated that, in various embodiments hereof, the processor 135 is configured to cause the camera 130 to capture an image of the object in the object holder. The processor may be further configured to adjust a position of the camera, change a focus of the camera, change a resolution of the camera, and zoom a lens of the camera.

A "storage device", at 134 of FIG. 1, refers to a hard drive, memory, flash drive, USB device, and other volatile or non-volatile storage media, as is generally understood in the computing arts. Processor 135 is shown in communication with the storage device. The storage device contains marks and/or machine readable program instructions.

A "mark" or a "marking" refers to one or more of: a logo, text, a graphic, an image, a number, a letter, and a design which is desired to be printed on the surface of the object in the object holder. An example mark is shown at 210 in FIG. 2.

"Retrieve a mark" is intended to be widely construed and includes: retrieving, receiving, acquiring, downloading, or otherwise obtaining a mark to be applied to the object. The mark can be retrieved by the processor 135 from memory 116, hard drive 134, or from a storage media such as a CDROM or DVD (not shown). A mark can be entered by a user or operator of the direct-to-object print system using, for example, user input device 124. The mark can be obtained from a remote device over a network.

"Receive an image" of the object in the object holder is also intended to be widely construed and includes retrieving, capturing, acquiring, or otherwise obtaining images. The image can be received or retrieved from a remote device over a network, or from a media such as a CDROM or DVD. The image may be received directly from a memory or storage device of the camera used to capture that image.

Figure 3:
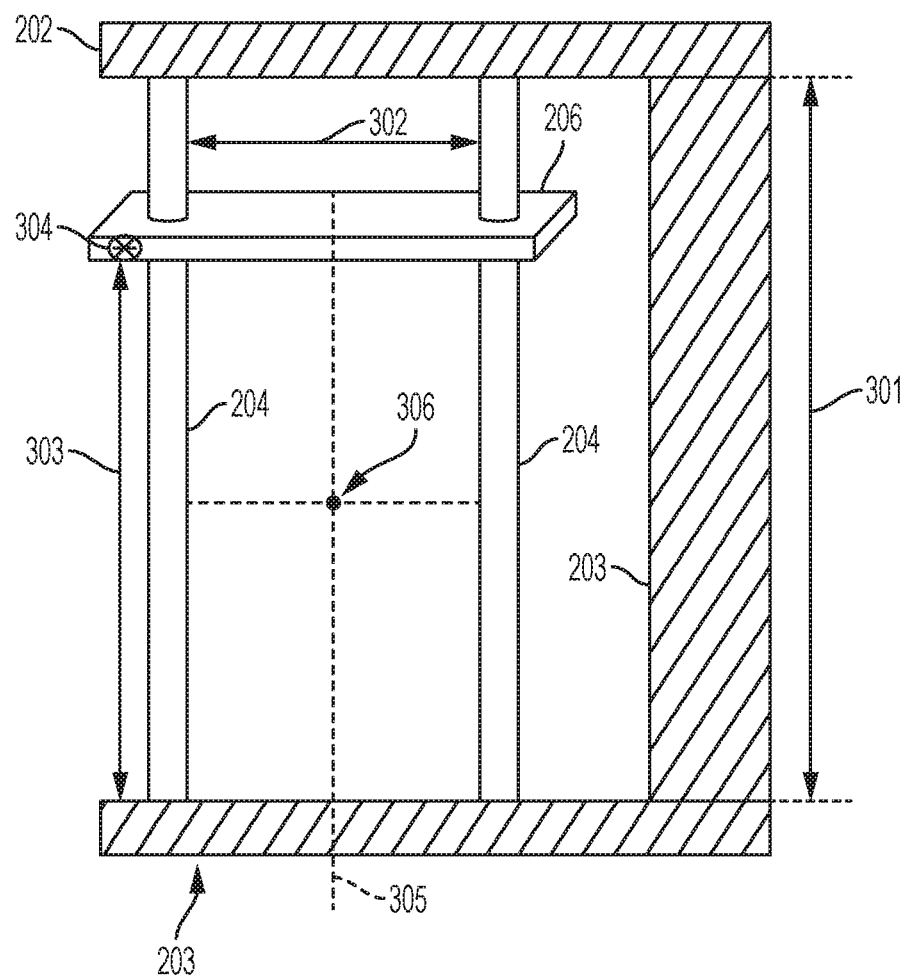
FIG. 3 shows the object holder of FIG. 2 without an object.
Figure 4:
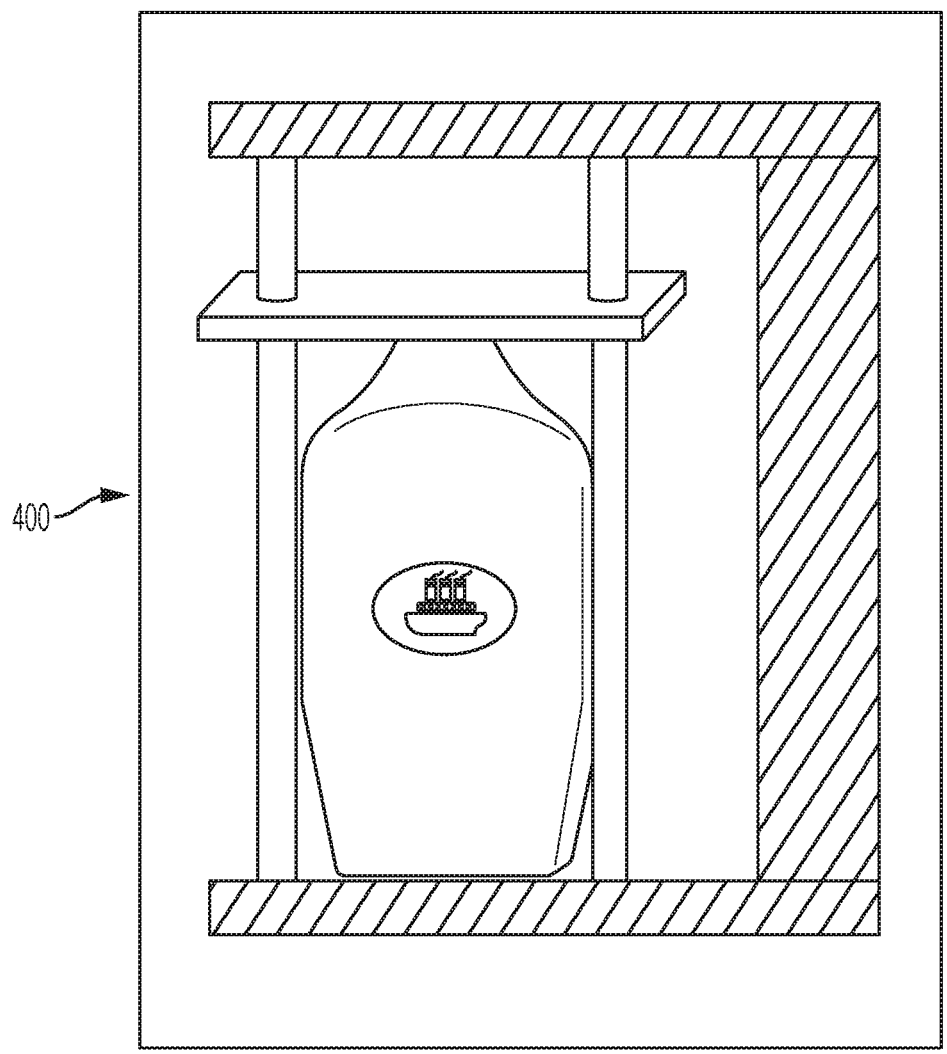
FIG. 4 shows an example image of the object in the object holder of FIG. 2 with a mark overlaid thereon for a user's review.
Figure 5:
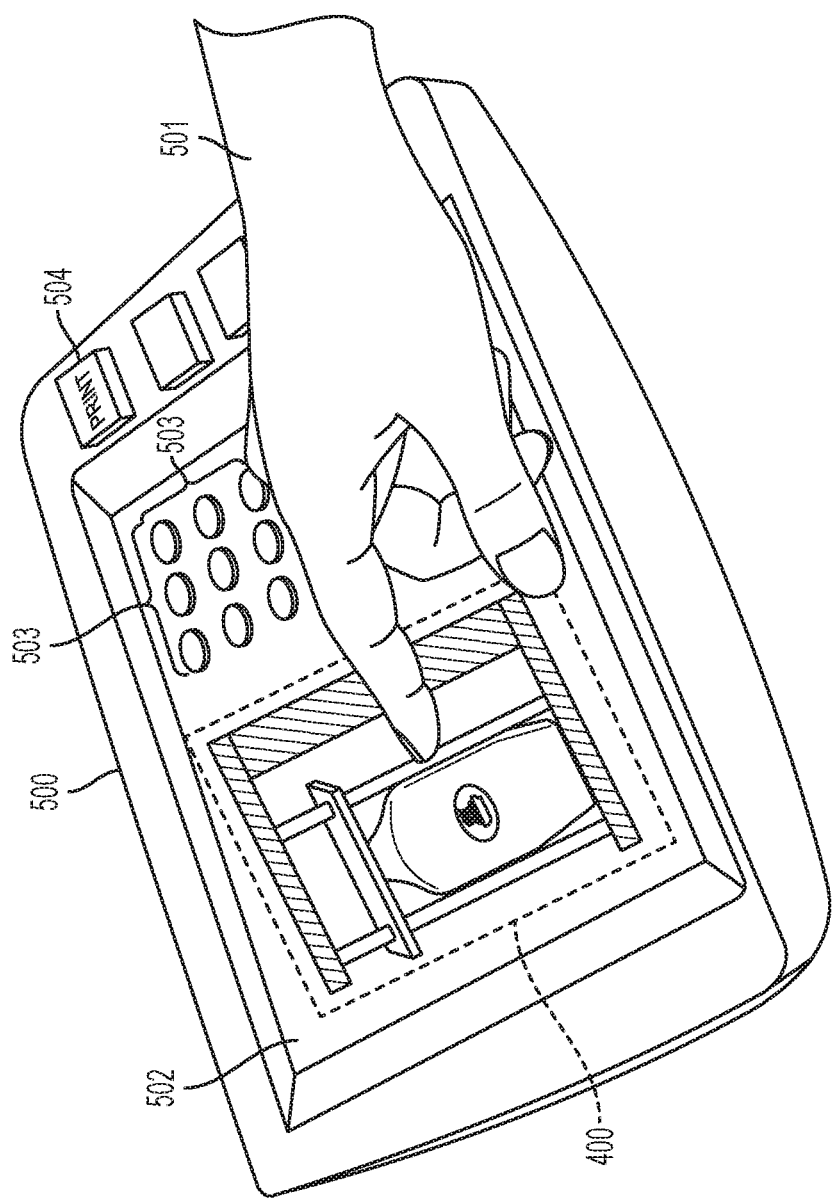
FIG. 5 shows the image of FIG. 4 displayed on a touchscreen of a user interface of a direct-to-object print system.

"Overlay the mark" on the object means to place the mark on the displayed image at a default location for a user's review. FIG. 3 shows, for discussion purposes, the example object holder of FIG. 2 without the object held therein. To determine a default location from the image of the object held in the object holder, the processor 135 calculates a distance (at 301) between the top and bottom arms 202 and 203 of the object holder is either fixed and thus known or can be determined using, for example, reference points 208 of FIG. 2. Further, a distance (at 302) between the two support arms 204 is either fixed and thus known or can be calculated using one or more reference points (not shown). Moreover, the processor can calculate a height (at 303) of the object by determining a position of the restraining bar 206 seated on top of the object. This can be effectuated using, for example, a feature of the object holder itself such as an edge of the restraining bar or by using an example a reference point 304. In such a manner, the processor calculates a centerline 305 as well as a center point 306. The center point is then used as a default location for placement of the mark on the object in the image. The image with the desired mark overlaid thereon is then displayed on the display of the user interface for the user's review. FIG. 4 shows an example displayed image 400 of the bottle 115 in the object holder of FIG. 2 with a mark overlaid thereon using the default location determined with respect to FIG. 3. Upon review of the displayed image with the overlaid mark, if the user wishes to move the mark to another location on the object then the user would utilize the input device to move the overlaid mark or, for instance, use a mouse or touchpad to drag and drop the mark to another location on the object in the image. FIG. 5 shows the image 400 of FIG. 4 displayed on an embodiment of a user interface 500 of the present direct-to-object print system. As shown, the user 501 is actively utilizing the functionality of the touchscreen display device 502 to manually drag and drop the mark (210 of FIG. 2) to a different location on the bottle 115 in the displayed image. The embodiment of the user interface further incorporates a plurality of selectable software objects (collectively as buttons 503) which enable a user to manipulate various aspects of the displayed image. Such additional functionality includes, for example, a software button which brings up a virtual keyboard on the touchscreen 502 for a user to enter alphanumeric text which can be used as a mark. Another software button enables the user to enlarge the image as needed. Another button enables the user to re-center mark back to a default point such as the center point 306 of FIG. 3. Another button causes the processor to determine whether the entire mark is entirely on a surface of the object. Another button enables the user to capture another image from the camera or to control various aspects of the camera such as, for instance, adjust a position of the camera, change a focus of the camera, change a resolution of the camera, and zoom a lens of the camera. Still other buttons enable the user to retrieve a pre-made mark from memory or a hard drive, and save one or more marks. Other buttons enable the user to configure various aspects of the direct-to-object print system such as the controller, actuator, printhead, to name a few aspects of the direct-to-object print system disclosed herein. It should be appreciated that a software object generally takes the form of a small pictogram to provide a user with a visual representation of the functionality which the software button executes when selected. Text, audio, and/or video may be associated with a button. When the user is finished moving the mark to a desired location the user would, for example, select the hardware button 504 which causes the processor to determine a final location of the mark on the object in the image.

It should be appreciated that a touchscreen display can be configured by software to display a wide variety of graphical widgets such as, for instance, numeric and text windows, scroll bars, dials, slideable bars, buttons, charts, plots, graphs, images, and the like. The embodiment shown is illustrative and may include any other functionality which any touchscreen known in the art is capable of displaying. Software used to configure a particular device to display an image and accept a user input is often device-dependent and may be proprietary to a particular manufacturer. Therefore, a further discussion regarding specific software algorithms to program or otherwise configure a touchscreen is omitted herein. Those of ordinary skilled would program their user interface to display selectable menus to perform some or all of the functionality described herein.

Figure 6:
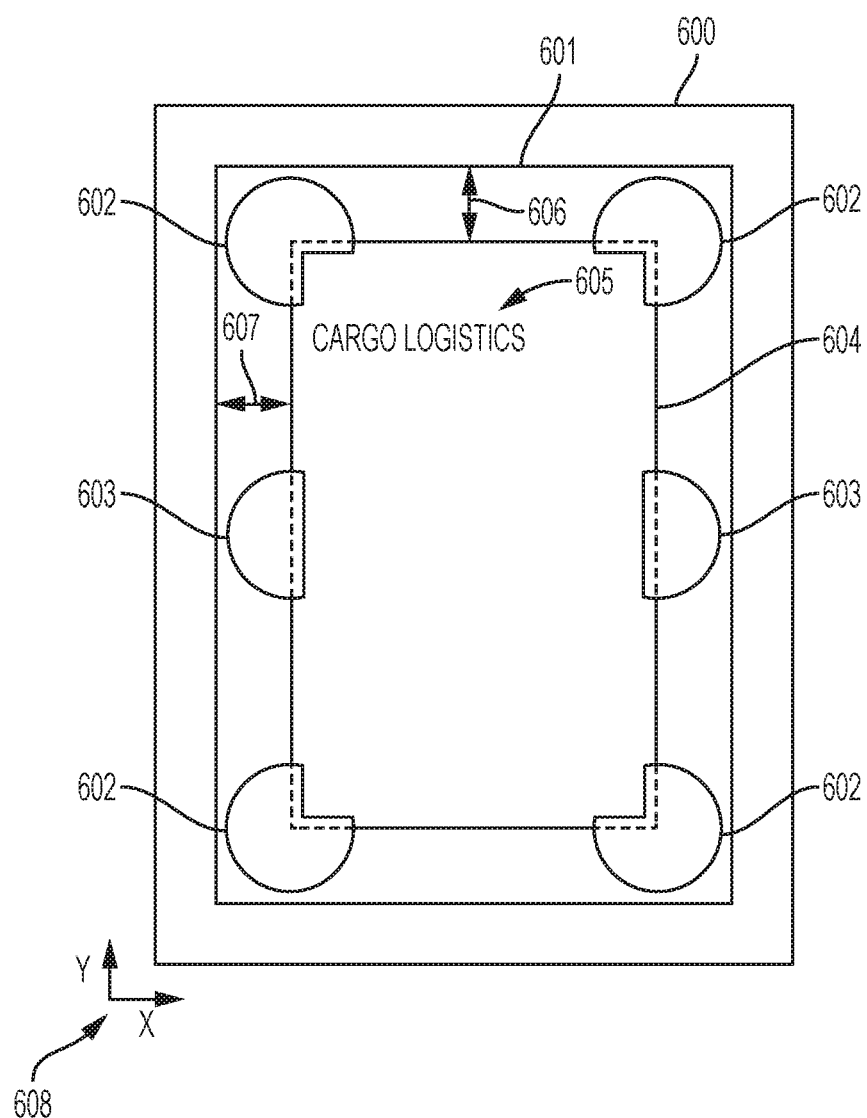
FIG. 6 shows a displayed image of a rectangular object holder with four corner restraints and two edge restraints collectively restraining an example object with a company logo mark on it.

"Determine a location" of the mark in the image means to identify where the mark is overlaid so that the printhead(s) can print the mark on the object at that location. Depending on the type of object holder being used to retain the object, the location can be determined relative to one or more edges of the object, relative to one or more edges of the object holder, and/or relative to one or more reference points on the object holder. Reference is now being made to FIG. 6 which shows a displayed image 600 of a rectangular object holder 601 with four corner restraints 602 and two edge restraints 603 to collectively retain the example object 604. Assume for discussion purposes that the user has used the touchscreen display of a user interface to manipulate a location of the mark 605 of a fictitious company called "CARGO LOGISTICS" to the location shown on object. Depending on the implementation of the object holder, the location can be determined with respect to one or more edges of the object, one or more edges of the object holder, or one or more reference points on the object holder. In the embodiment of FIG. 6, given that the size of the object holder 601 is known and that the size of the corner and edge retainers is also known, the processor can calculate a first distance (at 606) that the object 604 is from a first edge of the object holder and a second distance (at 607) that the object is from a second edge of the object holder. Moreover, the processor can readily obtain or otherwise determine a size of the mark. For instance, a size of the text used to create the logo 604 is readily obtainable from display device as well as a size of an image or graphical logo. Further, the processor can obtain a resolution of the displayed image (typically in pixels) from the imaging device used to capture that image. With such information, the processor can determine a location of the mark on the object either in pixels or in real world coordinates 608. In such a manner, the processor can also readily determine whether the boundaries of a given mark extend beyond an edge of the object in the image. If it is determined that the mark extends beyond an edge of the object, the processor can signal a warning to the user using, for example, the annunciator 122 of the user interface of FIG. 1 and otherwise prevent the user from selecting the PRINT button 504 of FIG. 5. In accordance with the teachings hereof, once the location of the mark on the object in the displayed image has been determined, the processor proceeds to communicate the mark and the determined location to a controller configured to cause an actuator to move the object holder past the printhead and further cause the printhead to print the mark on the object at the determined location.

Figure 7:
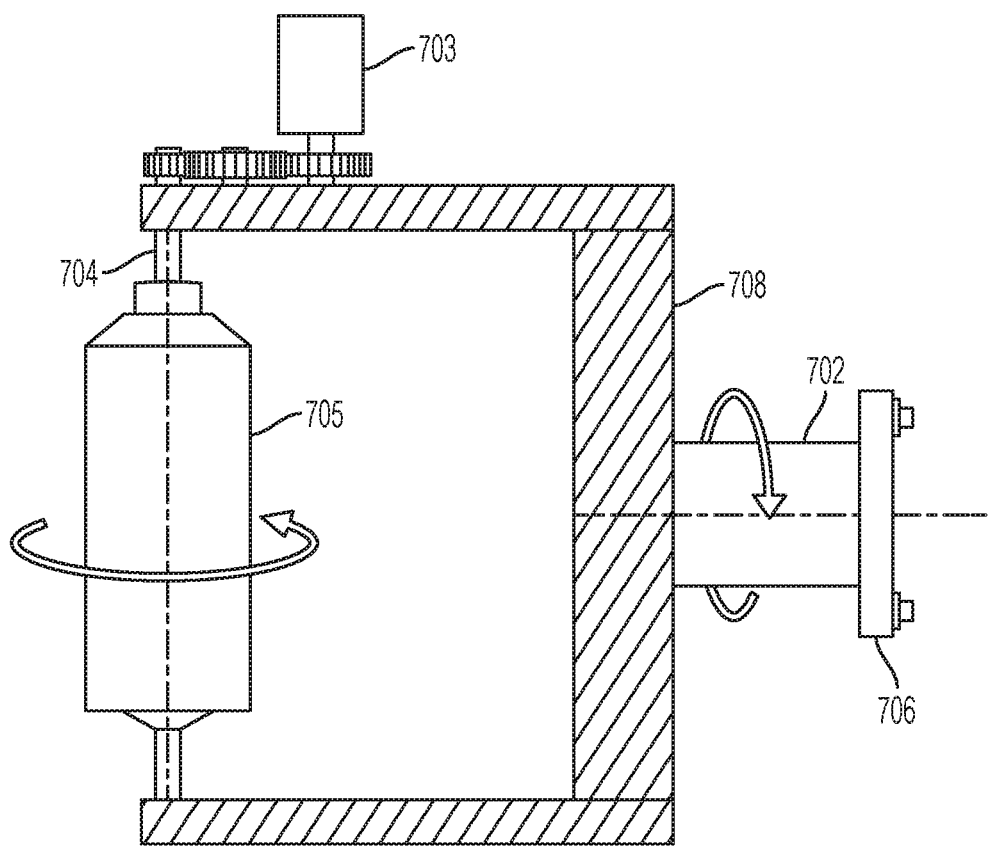
FIG. 7 shows another embodiment of an object holder which can be selectively rotated.

Reference is now being made to FIG. 7 which shows another embodiment of an object comprising a first rotatable shaft 704 is axially aligned with a centerline 209 of the object 705. A first motor 703, such as a stepper motor, selectively rotates shaft 704 such that the object can be rotated. A second motor 706, such as a stepper motor, selectively rotates shaft 702 so that the object holder can be rotated. The controller operatively controls the motors so that a position of the object can be held fixed while the object holder is selectively rotated or so that a position of the object holder is held fixed while the object is selectively rotated. Other embodiments may utilize only a single motor. In this embodiment, the user or operator utilized various controls of the user interface of FIG. 5 to selectively rotate the object so that the camera can take a picture of the object in a desired orientation. Thereafter, the captured image is displayed on a display device such as the touchscreen display 502. The processor determines a default location on the object for placement of a desired mark, in a manner as shown and described with respect to the embodiments of FIGS. 3-6. The image with the overlaid mark is displayed for a user's review. The user can accept overlaid mark in the present location or manipulate the location as desired. Once the user accepts the mark as placed, the location of the mark on the object is determined as well as a determination being made whether a boundary of the mark extends beyond an edge of the object. Once the location of the mark has been determined, the controller proceeds to cause the actuator to move the object holder along the support member past the printhead. The printhead(s) print the mark at the determined location.

It should be appreciated that various operative steps such as: "receive", "retrieve", "overlay", "perform", "determine", "cause", "communicate", and the like, as used herein, include the application of any of a variety of techniques as well as mathematical operations according to any specific context or for any specific purpose. It should be appreciated that such steps may be facilitated or otherwise effectuated by a microprocessor executing machine readable program instructions such that the intended functionality is effectively performed.

Embodiments of Direct-To-Object Print Systems

What is also disclosed is a direct-to-object print system configured to operatively use various embodiments of the marking system of the present invention.

Figure 8:
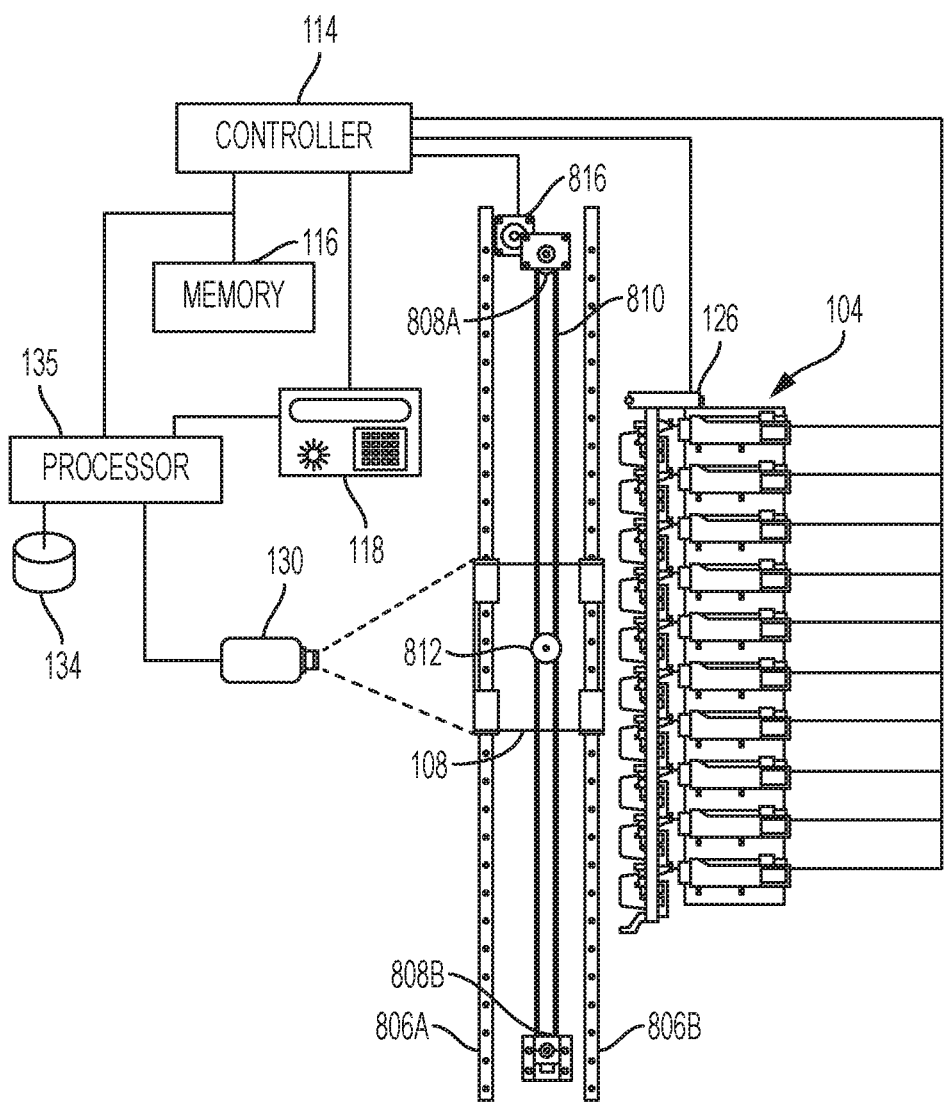
FIG. 8 shows an alternative embodiment of the direct-to-object print system of FIG. 1.

Reference is now being made to FIG. 8 which illustrates an alternative embodiment to the direct-to-object print system of FIG. 1 which uses a belt to move the object holder past the printheads. The support member comprises a pair of support members 806A and 806B about which the shuttle mount 108 is slideably attached. A pair of fixedly positioned pulleys 808A and 808B and a belt 810 form an endless belt entrained about the pair of pulleys, and a rotatable pulley 812 engages the endless belt to enable the third pulley to rotate in response to the movement of the endless belt moving about the pair of pulleys to move the object holder disclosed herein. The actuator 816 operatively rotates the drive pulley to move the endless belt about the pulleys. The controller 114 is configured to operate the actuator. The object holder of FIG. 1 has been omitted to show underlying components.

Figure 9:
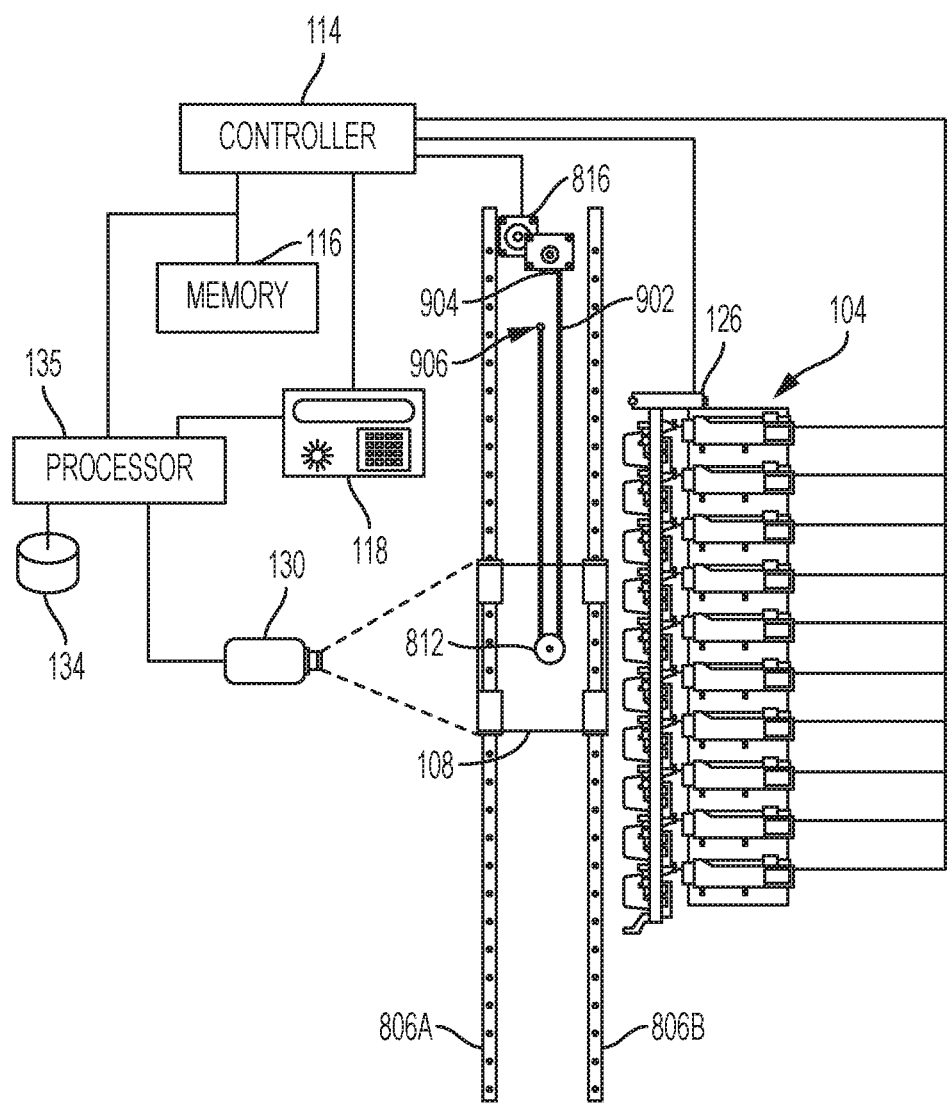
FIG. 9 shows another alternative embodiment of the direct-to-object print system of FIG. 1.

Reference is now being made to FIG. 9 which illustrates yet another embodiment of the direct-to-object print system of FIG. 1. One end of a belt 902 is operatively connected to a take-up reel 904 that is operatively connected to the actuator 816. The other end of the belt is positionally fixed at 906. The belt 902 also engages a rotatable pulley 812 attached to the object holder. The support member comprises a pair of support members 806A and 806B about which the shuttle mount 108 is slideably attached. The actuator rotates the take-up reel to wind a portion of the length of the belt about the take-up reel to cause the object holder to move past the printheads. The actuator unwinds the belt from the take-up reel. The controller 114 is configured to operate the actuator. The object holder of FIG. 1 has been omitted to show underlying components.

Figure 10:
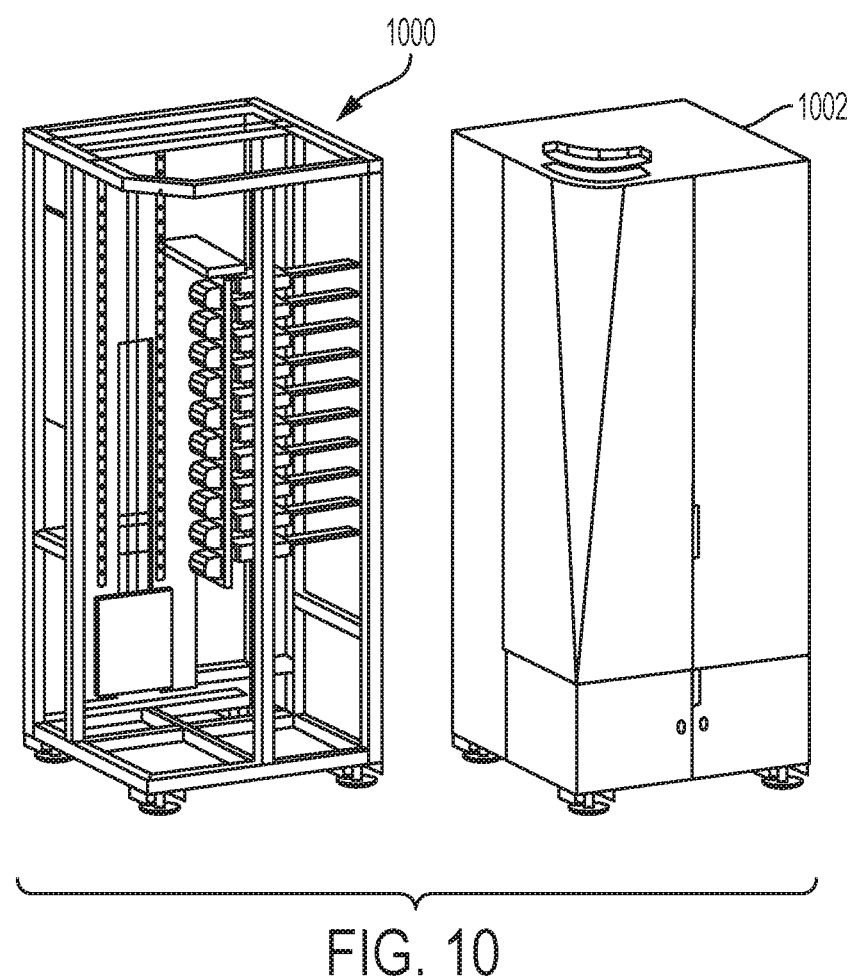
FIG. 10 show one embodiment of the present direct-to-object print system housed in a cabinet.

Reference is now being made to FIG. 10 which shows an embodiment of the direct-to-object print system 1000 housed in a cabinet 1002. The object holder is omitted.

The direct-to-object print system disclosed herein can be placed in communication with a workstation, as are generally understood in the computing arts. Such a workstation has a computer case which houses various components such as a motherboard with a processor and memory, a network card, a video card, a hard drive capable of reading/writing to machine readable media such as a floppy disk, optical disk, CD-ROM, DVD, magnetic tape, and the like, and other software and hardware needed to perform the functionality of a computer workstation. The workstation further includes a display device, such as a CRT, LCD, or touchscreen device, for displaying information, images, classifications, computed values, extracted vessels, patient medical information, results, interim values, and the like. A user can view any of that information and make a selection from menu options displayed thereon. The workstation has an operating system and other specialized software configured to display alphanumeric values, menus, scroll bars, dials, slideable bars, pull-down options, selectable buttons, and the like, for entering, selecting, modifying, and accepting information needed for processing in accordance with the teachings hereof. The workstation can display images and information about the operations of the present direct-to-object print system. A user or technician can use a user interface of the workstation to set parameters, view/adjust/delete values, and adjust various aspects of various operational components of the present direct-to-object print system, as needed or desired, depending on the implementation. These selections or inputs may be stored to a storage device. Settings can be retrieved from the storage device. The workstation can be a laptop, mainframe, or a special purpose computer such as an ASIC, circuit, or the like.

Any of the components of the workstation may be placed in communication with any of the modules and processing units of the direct-to-object print system and any of the operational components of the present direct-to-object print system can be placed in communication with storage devices and computer readable media and may store/retrieve therefrom data, variables, records, parameters, functions, and/or machine readable/executable program instructions, as needed to perform their intended functions. The various components of the present direct-to-object print system may be placed in communication with one or more remote devices over network via a wired or wireless protocol. It should be appreciated that some or all of the functionality performed by any of the components of the direct-to-object print system can be controlled, in whole or in part, by the workstation.

The teachings hereof can be implemented in hardware or software using any known or later developed systems, structures, devices, and/or software by those skilled in the applicable art without undue experimentation from the functional description provided herein with a general knowledge of the relevant arts. One or more aspects of the systems disclosed herein may be incorporated in an article of manufacture which may be shipped, sold, leased, or otherwise provided separately either alone or as part of a product suite or a service. The above-disclosed and other features and functions, or alternatives thereof, may be desirably combined into other different systems or applications.

Presently unforeseen or unanticipated alternatives, modifications, variations, or improvements may become apparent and/or subsequently made by those skilled in this art which are also intended to be encompassed by the following claims.

What is claimed is:

1. A system for applying a mark to a surface of an object in a direct-to-object print system, the system comprising:
    a camera for capturing an image of an object retained by an object holder configured to slideably traverse a support member positioned to be parallel to a plane formed by at least one printhead of a direct-to-object print system comprising, at least in part, an actuator for operatively causing the object holder to slideably traverse the support member, the controller being configured to cause the actuator to move the object holder past the printhead; a belt that contacts pulleys, one of the pulleys being operatively connected to the actuator which causes the pulley to move the belt about the pulleys and move the object holder past the printhead, wherein the belt is entrained about the pulleys to form an endless belt; and an additional pulley that engages the endless belt to enable the additional pulley to rotate in response to a movement of the endless belt to move the object holder; and
    a processor executing machine readable instructions which configure the processor to:
        receive, from the camera, an image of the object in the object holder;
        communicate the image to a display of a user interface;
        retrieve a mark desired to be printed on the object;
        overlay the mark on the object in the image in a default location;
        determine a final location of the overlaid mark relative to any of: at least one edge of the object, at least one edge of the object holder, and at least one reference point on the object holder; and
        communicate the mark and the determined final location to a controller configured to cause the printhead to print the mark on the object at the final location.

2. The system of claim 1, further comprising an actuator for operatively causing the object holder to slideably traverse the support member, the controller being configured to cause the actuator to move the object holder past the printhead.

3. The system of claim 1, wherein the processor is further configured to enable a user to selectively perform any of: adjust a location of the mark on the object, adjust a size of the mark, edit the mark, and change an orientation of the mark relative to an edge of the object holder.

4. The system of claim 1, wherein the processor is further configured to perform any of: adjust a position of the camera, change a focus of the camera, change a resolution of the camera, zoom a lens of the camera, and cause the camera to capture an image of the object in the object holder.

5. The system of claim 1 wherein the processor is configured to retrieve the mark from any of: a memory, a hard drive, a user input device, and a remote device over a network.

6. A direct-to-object print system for printing on a surface of an object, comprising:
    at least one printhead configured to eject marking material on to a surface of an object;
    a support member positioned to be parallel to a plane formed by the printhead;
    an object holder configured to slideably traverse the support member, the object holder retaining the object while it is being printed;
    an actuator for operatively causing the object holder to slideably traverse the support member, the controller being configured to cause the actuator to move the object holder past the printhead;
    a belt that contacts pulleys, one of the pulleys being operatively connected to the actuator which causes the pulley to move the belt about the pulleys and move the object holder past the printhead, wherein the belt is entrained about the pulleys to form an endless belt;
    an additional pulley that engages the endless belt to enable the additional pulley to rotate in response to a movement of the endless belt to move the object holder;
    a camera for capturing an image of the object held by the object holder; and
    a processor executing machine readable instructions which configure the processor to:
        receive, from the camera, an image of the object in the object holder;
        communicate the image to a display of a user interface;
        retrieve a mark desired to be printed on the object;

overlay the mark on the object in the image in a default location;

determine a final location of the overlaid mark relative to any of: at least one edge of the object, at least one edge of the object holder, and at least one reference point on the object holder; and communicate the mark and the determined final location to a controller configured to cause the printhead to print the mark on the object at the final location.

7. The direct-to-object print system of claim 6, wherein the support member is oriented to enable one end of the support member to be at a higher gravitational potential than another end of the support member.

8. The direct-to-object print system of claim 6, wherein the processor is further configured to enable a user to selectively perform any of: adjust a location of the mark on the object, adjust a size of the mark, edit the mark, and change an orientation of the mark relative to an edge of the object holder.

9. The direct-to-object print system of claim 6, wherein the processor is further configured to perform any of: adjust a position of the camera, change a focus of the camera, change a resolution of the camera, zoom a lens of the camera, and cause the camera to capture an image of the object in the object holder.

10. The direct-to-object print system of claim 6, wherein the processor is configured to retrieve the mark from any of: a memory, a hard drive, a user input device, and a remote device over a network.

11. The direct-to-object print system of claim 6, further comprising an identification tag and an input device.

12. The direct-to-object print system of claim 11, wherein the identification tag comprises any of: a RFID tag containing an identifier and the input device is a RFID reader, a barcode containing an identifier and the input device is a barcode reader, and at least one mechanical feature and the input device is a biased arm that follows the mechanical features and converts a position of the arm into an electrical signal comprising an identifier.

13. The direct-to-object print system of claim 11, wherein the controller is further configured to:

receive the identifier from the input device;

compare the identifier to at least one identifier stored in a memory; and disable the actuator in response to the identifier failing to correspond to any of the identifiers stored in memory.

14. The direct-to-object print system of claim 11, wherein the controller is further configured to:

receive the identifier from the input device;

compare the identifier to identifiers stored in a memory; and disable operation of the printhead in response to the identifier failing to correspond to any of the identifiers stored in memory.

15. The direct-to-object print system of claim 6, wherein the controller is further configured to:

detect a configuration of the printhead and ink supplied to the printhead; and communicate a message to the user interface, the message being any of: that ink needs to be changed, and that the printhead needs to be reconfigured.

16. The direct-to-object print system of claim 6, further comprising a sensor positioned to capture image data from one of: the object holder, the object, and a sheet of printed media, the controller being configured to receive the image data from the sensor and analyze the image data to identify any of: printhead alignment, image quality, and inoperative ejectors.

* * * * *